United States Patent [19]

Ohta

[11] Patent Number: 4,892,747
[45] Date of Patent: Jan. 9, 1990

[54] LOW-CALORIE CEREAL AND PROCESS FOR PREPARING THE SAME

[75] Inventor: Atsutane Ohta, Tokyo, Japan

[73] Assignee: Terumo Kabushiki Kaisha, Shibuya, Japan

[21] Appl. No.: 219,055

[22] Filed: Jul. 12, 1988

Related U.S. Application Data

[63] Continuation-in-part of Ser. No. 65,378, Jun. 23, 1987, abandoned.

[30] Foreign Application Priority Data

Jun. 30, 1986 [JP] Japan ................................ 61-151609

[51] Int. Cl.⁴ .............................................. A23L 1/10
[52] U.S. Cl. .................................... 426/618; 426/509; 426/804
[58] Field of Search ................ 426/618, 509, 407, 804

[56] References Cited

U.S. PATENT DOCUMENTS

| | | | |
|---|---|---|---|
| 3,647,486 | 3/1972 | Tollefson et al. | 426/618 |
| 4,003,302 | 1/1977 | Mencacci et al. | 426/407 |
| 4,101,683 | 7/1978 | Kamada et al. | 426/618 |

FOREIGN PATENT DOCUMENTS 59-82058  5/1984  Japan ................................. 426/618

*Primary Examiner*—George Yeung
*Attorney, Agent, or Firm*—Burns, Doane, Swecker & Mathis

[57] ABSTRACT

Low-calorie boiled cereal, preferably rice gruel, with reduced carbohydrate, particularly a saccharide component. The cereal is useful as low-calorie food for the therapy and prevention of obesity and therapy of diabetes. The cereal is prepared by adding to one part by weight of boiled cereal, 2-10 parts by weight of water or diluted aqueous acid heated at 60° C. or higher, warming the mixture of 60° C. or higher for 1 to 30 min. while maintaining the viscosity of the water of diluted aqueous acid at 200 cP or below, removing the liquid part and adding 0.05-5 parts by weight of water containing 0.1-10 parts by weight of water-soluble dietary fiber.

2 Claims, 2 Drawing Sheets

LOW-CALORIE CEREAL AND PROCESS FOR PREPARING THE SAME

The present invention is a continuation-in-part of U.S. Ser. No. 065,378, filed June 23, 1987, now abandoned.

BACKGROUND OF THE INVENTION

1. Field of the Invention

The invention relates to a low-calorie cereal and a process for preparing the same.

More particularly, it is concerned with a boiled granular low-calorie cereal with a reduced carbohydrate component and a process for preparing the same.

The cereal of the invention has reduced carbohydrate, particularly saccharide content so that it is useful as low-calorie food for therapy and prevention of obesity as well as therapy of diabetes.

2. Description of Prior Art

In order to limit caloric intake in the therapy and prevention of obesity and the therapy of diabetes, in some cases, there has been applied intake of plain rice gruel or rice gruel with vegetables. The method is based upon reduction of caloric level per unit weight due to swelling of rice grains as a result of absorption of a large amount of water when rice is boiled into gruel. However, as starch which accounts for almost all of the saccharides in rice is converted to α-starch when rice is boiled into gruel, it becomes more digestible and utilizable in the body thereby reducing the effect of the limited caloric intake.

Furthermore, prior gruels have the disadvantage that turning yellow and disintegration of the grains of rice readily occur.

On the other hand, there has been adopted a reduction of calorie level per unit weight by intake of a filler and thickener such as dietary fibers, alone or in addition to other foods.

In recent years attention has been called to dietary fibers because of their action in improving the metabolism of saccharides and lipids.

The dietary fibers, however, are disadvantageous in that it is difficult to take them alone and an addition of them to other food will deteriorate taste and flavor in many cases due to their unpleasant taste and flavor.

SUMMARY OF THE INVENTION

Figure 1:
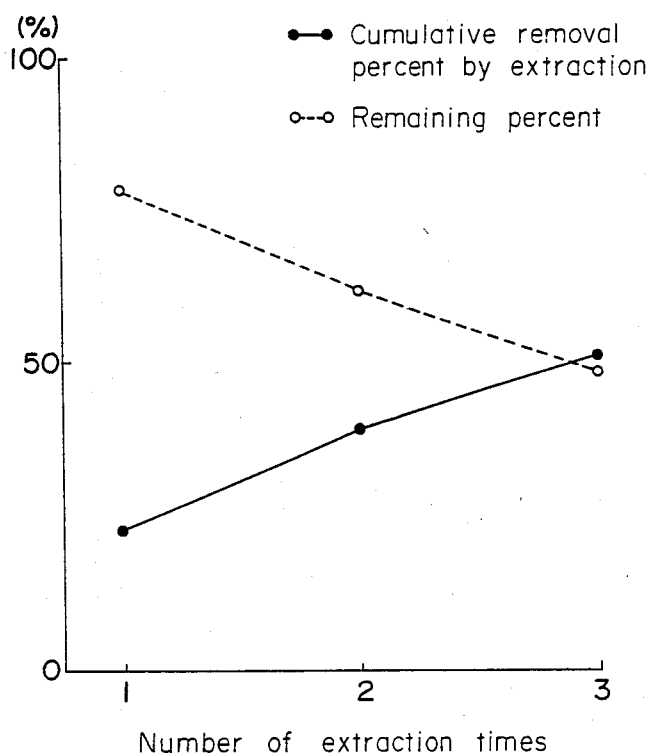
FIG. 1 and FIG. 2 are graphs indicating cumulative removal percentage of saccharide by extraction and the remaining percent of saccharides in the desaccharified rice obtained in Example 1 and Example 2, respectively.

It is an object of the present invention to provide a boiled granular low-calorie cereal in which the problems of the prior art have been overcome, that is, caloric level per unit weight is very low. Nevertheless, dietary fibers can easily be taken in, and moreover, appearance, taste and flavor are similar to those of plain rice gruel.

It is another object of the present invention to provide a process for preparing the same.

According to the invention, there is provided a low-calorie cereal comprising a boiled granular low-calorie cereal with reduced carbohydrates, particularly a reduced saccharide content and, as needed, thickeners, fillers and seasonings.

Further according to the invention, there is provided a process for preparing a boiled granular low-calorie cereal which comprises boiling a cereal, adding to the boiled cereal water or a diluted aqueous acid at a temperature of 60° C. or higher, warming the mixture to 60° C. or higher for a period from 1 to 30 min. while maintaining viscosity of said water or diluted aqueous acid at 200 cP or below and then removing the solution.

A cereal as used herein includes rice, wheat, barley, rye, foxtail millet, barnyard grass and the like.

When rice is employed as the starting material in the invention, any of whole rice, half-polished rice, 70%-polished rice, polished rice, rice with germs and alpha rice, in grain or crushed form may be used.

Dietary fibers are used as the thickener or filler of the present invention. Those which are highly soluble such as carrageenin, pectin, xanthan gum, guayule gum and arabic gum are preferable.

As the seasonings, any one or more of the conventional ones such as salt, soybean sauce, sodium glutamate, vinegar, sweet sake (mirin), rice wine (sake) and miso may be used. In addition, spices may be added as needed.

The preparative process of the invention will be described below with reference to the use of rice as the starting material. The process may be carried out in the same way with a cereal other than rice. Raw rice, after it is washed, is boiled by a conventional method such as using a pressure cooker, an electronic cooker or a kettle. To the boiled rice is added a sufficient amount of water or a diluted aqueous solution of an acid such as acetic acid or phosphoric acid warmed to a temperature of 60° C. or higher. Preferably, 2–10 parts by weight of water or a diluted aqueous acid is added. The mixture is gently heated with stirring. Concentration of the acid in the solution is suitably in the range between 0.025 and 0.5%. The heating with stirring is continued for a period between 1 min. and 30 min., and the solution is removed by filtration or decantation. If the temperature of the water or the diluted aqueous solution of an acid such as acetic acid or phosphoric acid is lower than 60 C desaccharification of the boiled rice will disadvantageously be slow. The higher-temperature and shorter-time treatment results in swelling 1.5 to 2.5 times larger than the original while keeping the rice grains in shape. By carrying out the above-described procedures one to several times, the saccharide content is extracted into the solution so that the calorie level per unit weight becomes much lower than boiled rice.

Removal of the saccharides by extraction may also be effected by circulating water or a dilute aqueous acid such as acetic acid or phosphoric acid warmed to 60.C or higher in an extraction tank.

In the desaccharification of boiled rice it is necessary to maintain the viscosity of a saccharide-extraction solution not higher than 200 cP. If viscosity of the extraction solution exceeds the above level, the shearing force applied to the rice grains will be so large that they will be apt to be deformed and separation of the rice grains from the solution will be difficult.

Separation of rice grains from the liquid portion by means of a 20-mesh screen is difficult even with the usual 50:50 plain rice gruel. Then, permeability through the screen and degree of the transformation of rice into gruel were compared under various viscosity conditions of the extract. To 650 g of polished rice was added 1 lit. of water, and the mixture was boiled in an electric cooker in a conventional way. There was produced 1450 g of boiled rice. The boiled rice was divided into 350 g portions which were each placed in size 3 lit. kettles. To the kettles were added 0.5, 0.75, 1.0, 1.25, 1.5 and 2 lit. of water, respectively. The kettles were then put over a slow fire for 30 min. Permeability through the screen and degree of the transformation of rice into gruel of the saccharide extract were compared using the six samples thus obtained. The result are shown in Table 1. As seen from Table 1, the rice grains are hardly deformed when the viscosity of the extract is 200 cP or lower, desirably 100 cP or lower.

TABLE 1

| Water added (lit.) | Permeability through the screen | | | Viscosity cP | Degree of the transformation into gruel |
| --- | --- | --- | --- | --- | --- |
| | 20 mesh | 35 mesh | 100 mesh | | |
| 0.5 | X | X | X | Not measurable | Transformed |
| 0.75 | O | X | X | 210 | Transformed |
| 1.0 | O | X | X | 152 | |
| 1.25 | ⊚ | O | O | 62 | |
| 1.5 | ⊚ | ⊚ | O | 25 | |
| 2.0 | ⊚ | ⊚ | O | 18 | |

Permeability through the screen:
X ... Poor
O ... Good
⊚ ... Excellent

According to the above method, it is usually possible to reduce the remaining percent of carbohydrates to 80% by weight or lower.

To the boiled rice desaccharified in such a way as described above is added an aqueous solution containing 0.1–10% of one or more of the above-mentioned dietary fibers in a volume 0.5 to 5 times as much, and the mixture is heated with stirring. In general, the temperature at which the heating is made is desirably 60° C. or higher though it may be varied depending upon the solubility of the dietary fibers employed. The heating time is desirably from 1 min. to 5 min.

The rice gruel of the present invention can be preserved for a long period without substantially turning yellow or allowing substantial disintegration of the grains of rice. The gruel is preferably preserved after airtight sealing in an aluminum pack and sterilization by retort.

Finally, one or more of the above-mentioned seasonings are added to give a flavor to be fixed depending upon the need for the therapy or the patient's liking.

The invention will be described in more detail below by way of examples and test examples.

EXAMPLE 1

To 320 g of polished rice, after it was washed, was added 480 ml of water, and the mixture was boiled in an electric cooker. To the boiled rice was added 2 lit. of water, heated to 90° C., and the mixture was gently stirred for 5 min. while being heated. Then, the solution was removed by decantation. The above procedures were repeated three times in total. The solution and the rice grains produced at each operational stage were measured for saccharide concentration (in terms of glucose) by the phenolsulfuric acid method to determine cumulative removal percent of saccharides by extraction and the remaining percent of saccharides. The results are shown in FIG. 1. As seen in FIG. 1, the above procedures resulted not only in removal of approximately 50% of the saccharides but also in swelling of the rice gains to approximately twice as much in volume. Next, 20 solutions of dietary fibers were prepared in 20 beakers each containing 50 ml of water heated at 80.C in which were dissolved 0.05 g, 0.1 g, 0.5 g, 1 g and 5 g of carrageenin, xanthan gum, pectin and arabic gum (manufactured by San-ei Kagaku), respectively. To each of the solutions was added 50 g of the desaccharified boiled rice, and the mixture was heated at 90° C. for 5 min. and allowed to cool at room temperature for 10 min.

An organoleptic test was performed for flavor with the 20 samples thus obtained. The results are shown in Table 2.

TABLE 2

| | Nature of dietary fibers | | | |
| --- | --- | --- | --- | --- |
| Amount added | Carrageenin | Xanthan gum | Pectin | Arabic gum |
| 0.05 g | O | O | ⊚ | O |
| 0.1 g | ⊚ | O | O | O |
| 0.5 g | ⊚ | △ | △ | △ |
| 1.0 g | △ | X | X | X |
| 5.0 g | X | X | X | X |

O Excellent
⊚ Good
△ Fairly poor
X Poor

As the amount of dietary fibers added was increased, gelation became greater and the flavor was worse, though there was also variation depending upon the nature of the dietary fibers. Addition of 0.1 g 1 g or 0.5 g of carrageenin or 0.05 g of pectin produced excellent flavor.

EXAMPLE 2

Figure 2:
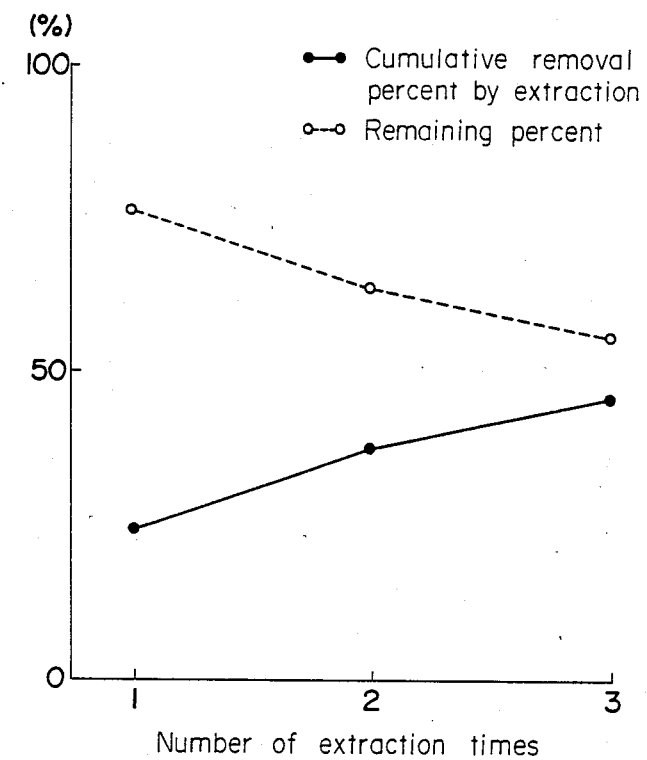

160 g of polished rice was washed and then 240 ml of water was added thereto, and the mixture was boiled in an electric cooker. To a half of the boiled rice was added 1 lit. of 0.01% aqueous acetic acid heated to 90° C., and the mixture was gently stirred for 5 min. while being heated. The solution was then removed by decantation. The above procedures were repeated three times in total. The solution produced at each operational stage was measured for saccharide by the phenol-sulfuric acid method to determine cumulative removal percent by extraction of saccharides from the boiled rice and the remaining percent of saccharides in the rice. The results are shown in FIG. 2. As seen from FIG. 2, the above procedures resulted not only in removal of approximately 45% of the saccharides but also in swelling of the rice grains to approximately twice as much in volume. To 100 g of the desaccharified boiled rice was added 100 ml of a solution in which 0.5 g of carrageenin had been dissolved, and the mixture was heated with stirring at 90° C. for 5 min. To the resulting mixture Was added 1 g of salt, 0.25 g of sugar and 0.05 g of sodium glutamate for seasoning to produce a low-calorie gruel-like food.

Separately, to 100 g of the above-prepared boiled rice was added 150 ml of water, and the mixture was heated over a slow fire for approximately 45 min. To the resulting mixture was added 1 g of salt, 0.25 g of sugar and 0.05 g of sodium qlutamate for seasoning to produce a plain rice gruel.

An organoleptic test was preformed by eleven persons on the low-calorie gruel-like food for appearance, taste and flavor taking the plain rice gruel obtained above as standard. The results are shown in Table 3. As seen in Table 3, the low-calorie gruel-like food was judged as equivalent to gruel for appearance, taste and flavor.

TABLE 3

| | Better than gruel | Equivalent to gruel | Worse than gruel |
|---|---|---|---|
| Appearance | 0 | 10 | 1 |
| Taste | 2 | 6 | 3 |
| Flavor | 1 | 7 | 3 |

EXAMPLE 3

2.5 kg of polished rice was washed and then 4 lit. of water was added thereto. The rice was boiled in an electric cooker to obtain 5 kg of boiled rice. To the boiled rice was added 5 lit. of boiling water and the resulting mixture was heated under gentle stirring for 20 min. The upper layer was then removed by filtration to afford 9 kg of boiled rice with reduced saccharide.

Thirty 300-ml aluminum pack for retort were prepared and 140 ml of the carrageenin solution and 140 of the desaccharide boiled rice were placed in each pack. The packs were desired and made airtight by heat sealer to obtain the food of the present invention.

Separately, 2.5 kg of polished rice was washed and 4 lit. of water was added thereto. The rice was boiled in an electric cooker to obtain 5 kg of boiled rice. To the boiled rice was added 5.5 lit. of water. The mixture was heated under gentle stirring for about 60 min. to obtain 10 kg of gruel. Thirty 300-ml aluminum pack for retort were prepared and 280 g of the gruel was placed in each pack. The packs were desired and made airtight by heat sealer to obtain control food.

The food of the present invention and the control food were sterilized at 115° C. for 20 minutes in a retort. Each group was divided into 3 groups of 10 packs each and stored in three different conditions: a low temperature (4° C.), room temperature (about 25° C.) and a high temperature (137° C.) for six months. The packs were opened six months later and tested. As to the control food, there was recognized disintegration of grain of rice in the groups stored at a room temperature and at a high temperature.

Further there was recognized discoloration to pale yellow in the group stored at a high temperature. However, as to the present food, there was recognized no change in the groups stored at any conditions.

The food of the present invention, as mentioned above, was confirmed to be superior to the control food in stability when process to retort food.

What is claimed is:

1. A stabilized retort food obtained by sealing in a pack for retort a rice gruel containing granular rice with saccharide reduced more than 20% which is obtained by adding 2-10 parts by weight of water or a dilute aqueous acid heated at 60° C. or higher to 1 part by weight of boiled granular rice, warming the resulting mixture at 60° C. or higher for a period from 1 to 30 minutes while maintaining the viscosity of said water or dilute aqueous acid at 200 cP or below, removing the liquid part of the mixture from the granular rice and adding 0.5-5 parts by weight of water containing 0.1-10 parts by weight of water-soluble dietary fiber to the remaining granular rice, and sterilizing by retort.

2. The stabilized retort food according to claim 1 wherein the dietary fiber is carregeenin.

* * * * *